United States Patent [19]
Gade et al.

[11] 3,848,315
[45] Nov. 19, 1974

[54] SCROLL WINDING AND LOADING APPARATUS

[75] Inventors: John N. Gade, Rush; James D. MacKay, Webster, both of N.Y.

[73] Assignee: Eastman Kodak Company, Rochester, N.Y.

[22] Filed: Sept. 10, 1973

[21] Appl. No.: 395,470

Related U.S. Application Data

[62] Division of Ser. No. 234,750, March 15, 1972, Pat. No. 3,787,954.

[52] U.S. Cl............................................. 29/200 B
[51] Int. Cl............................................. B23p 19/00
[58] Field of Search............... 29/200 B, 208 D, 430

[56] References Cited
UNITED STATES PATENTS

| | | | |
|---|---|---|---|
| 3,226,816 | 1/1966 | Wilson et al. | 29/200 B X |
| 3,457,627 | 7/1969 | Napor et al. | 29/430 |
| 3,787,954 | 1/1974 | Gade et al. | 29/430 |

*Primary Examiner*—Thomas H. Eager
*Attorney, Agent, or Firm*—K. D. Fosnaught

[57] ABSTRACT

Apparatus for use in a continuous process for winding a photographic element into a scroll and inserting such scroll into an open-ended double-chambered film cartridge body is disclosed. Winding is facilitated by a winding mechanism that accurately positions the leading end of the element with respect to a winding mandrel from which mandrel a completed scroll is advanced into the cartridge supply chamber a distance sufficient to center the free end of the element with respect to a heat sealing head. A core support member then so positions the cartridge takeup core axially within the cartridge takeup chamber that the core is aligned precisely with the free end of the element for staking thereto by means of the heat sealing head.

10 Claims, 8 Drawing Figures

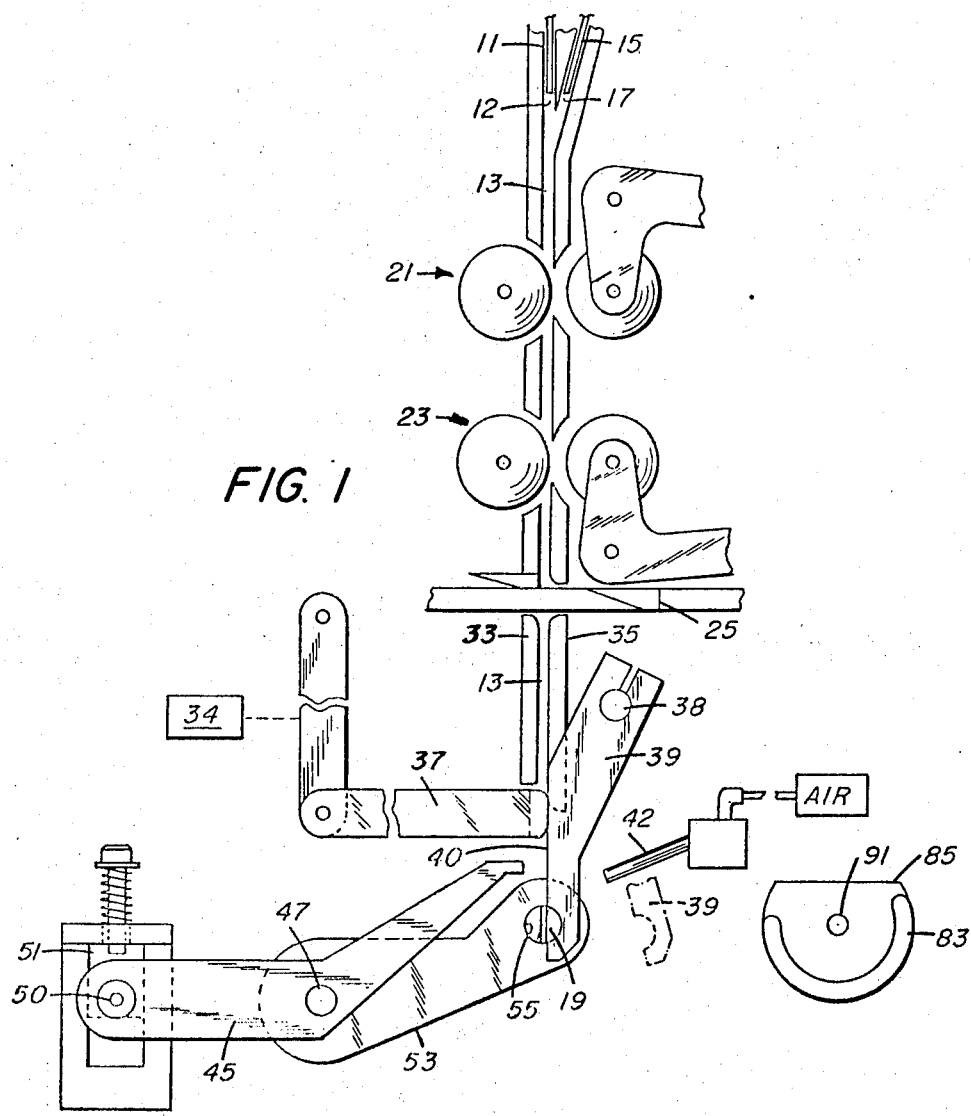
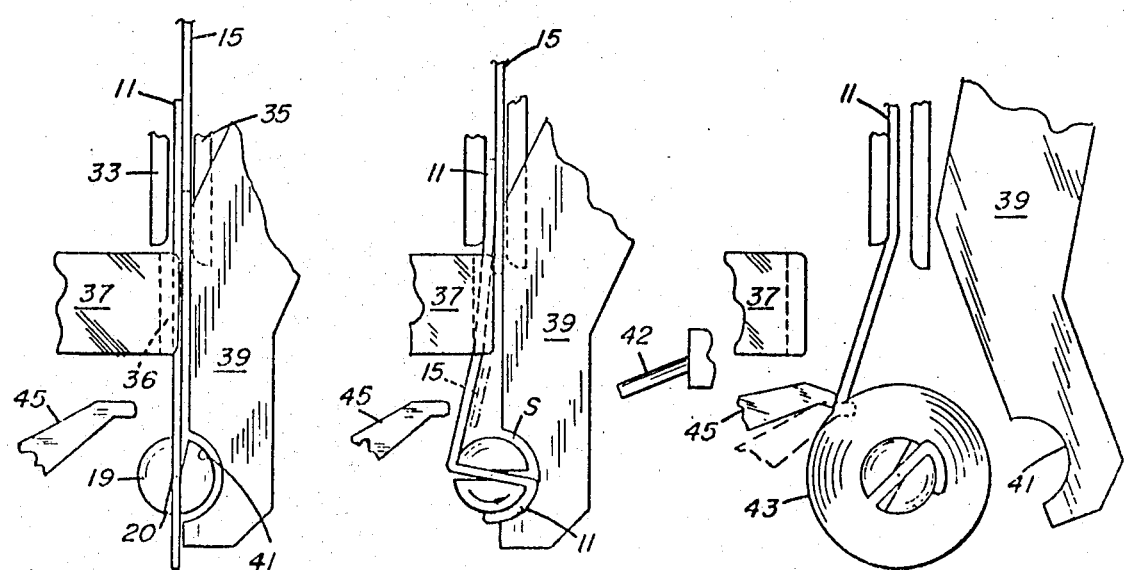
FIG. 1
FIG. 2   FIG. 3   FIG. 4

SCROLL WINDING AND LOADING APPARATUS

This is a division, of application Ser. No. 234,750 filed Mar. 15, 1972, now U.S. Pat. No. 3,787,954.

BACKGROUND OF THE INVENTION

1. Field of the Invention

This invention relates to the field of web winding and especially to apparatus for forming a coreless wound scroll from a photographic element consisting of a photosensitive filmstrip either alone or in combination with a light impervious backing strip, which may, for example, be paper. More particularly, the invention relates to apparatus for loading such a scroll into a film cartridge supply chamber and for precisely attaching the free end of the scroll to a cartridge takeup core according to known thermoplastic heat sealing techniques.

2. Description Relative to the Prior Art

In the field of cartridge loading, various techniques are known for use at a work station at which a photographic element is wound into a scroll, the scroll inserted into a cartridge supply chamber, and the free end of the element attached to a cartridge takeup core.

Such techniques may not, however, be suitable for use with all film cartridges such as where, for example, the cartridge is relatively small in size and thus requires a relatively compact work station. In this regard one known technique (U.S. Pat. No. 3,226,816) requires the cartridge takeup core to be conveyed to the spooling work station separate from the cartridge body and then attached to the scrolled photographic element and inserted into the cartridge body. In accordance with another known technique (U.S. Pat. No. 3,457,627), the core is conveyed to the work station within the cartridge body, but is then removed for attachment to the photographic element. In either case, such core-handling chores require appropriate apparatus, room for which must be provided at a work station; and such handling lengthens the time required for the operation and may affect time sequencing at other work stations.

Furthermore, known techniques may not align the photographic element with the film cartridge with sufficient precision: where cartridge tolerances are exacting, say in very small cartridges, such mis-alignment may require increased camera winding torque to advance the element through the cartridge and may even render the cartridge inoperable.

SUMMARY OF THE INVENTION

It has been found that, by cupping a film cartridge takeup core—by means of a moveable support cup—which cup is insertable into a cartridge takeup chamber, a photographic element may be attached to the core while the core is in such cartridge chamber.

It has further been found that, by inserting a photographic element scroll axially into an open-ended film cartridge supply chamber a distance sufficient to align the element with a heat sealing head and by then positioning the cartridge takeup core axially within the takeup chamber so as to bring the core into co-alignment, the photographic element can be more precisely aligned with and attached to the takeup core.

In accordance with the subject invention there is provided, at a scroll winding and loading station, a slotted winding mandrel in combination with a moveable web guide which also incorporates means for accurately cinching the leading end of the photographic web to the winding mandrel. Upon completion of winding, a reciprocable pusher arm operates to slide the fully wound scroll axially from the mandrel and into a film cartridge supply chamber, such scroll being thereby advanced a predetermined distance calculated to align the scrolled element with a prepositioned heat sealing head. A reciprocable scroll keeper exerts sufficient radially-directed pressure on the periphery of the wound scroll to prevent unscrolling during transfer of the scroll from the mandrel to the cartridge and until such time as the free end of the scrolled element is heat sealed to the cartridge takeup core. The heat sealing operation is facilitated by a dual-purpose reciprocable core support cup operable to enter the takeup chamber and draw the core into co-alignment with the scrolled element and the sealing head and to thereafter support the core during the sealing operation.

BRIEF DESCRIPTION OF THE DRAWINGS

FIG. 1 depicts a scroll forming station including a threader assembly and scroll-winding apparatus.

FIGS. 2, 3, and 4 depict a sequence of scroll-winding steps.

DESCRIPTION OF THE PREFERRED EMBODIMENT

Figure 5:
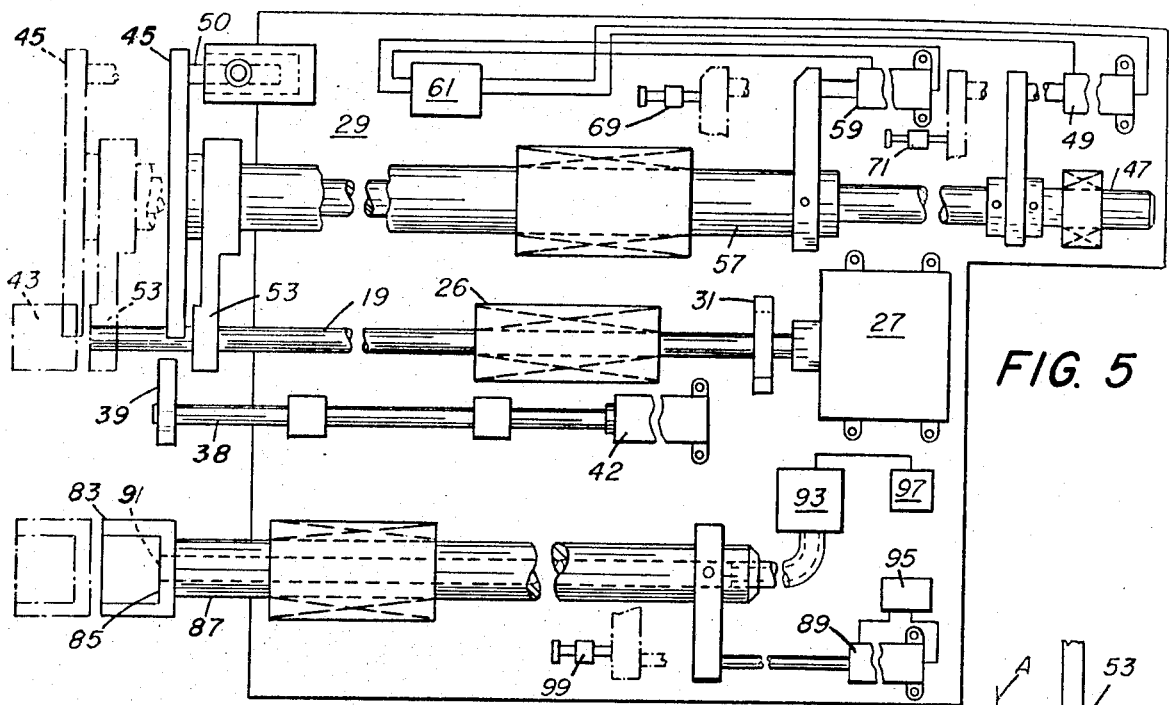
FIG. 5 is a plan view of the scroll-winding apparatus of FIG. 1.

In its presently preferred embodiment, the invention is cast in the environment of apparatus for use in loading photographic film into a chambered film cartridge. In a typical cartridge loading apparatus, a strip of photographic film is unwound from a storage roll and then metered to present a measured length thereof to a winding mandrel for forming the filmstrip into a scroll. If desired, a strip of light-impervious backing paper may be wound with the film to form an interwound scroll. The above operations are desirably accomplished in a continuous manner with several steps being carried out concurrently.

The invention has utility in the terminal or scroll-forming step of such an operation as illustrated in FIG. 1 wherein a continuous strip of backing paper 11 is fed into a paper guide channel 12 and thence into a common channel 13. A discrete strip of film 15 is fed into the common channel 13 through a film guide channel 17 for subsequent interwinding of the film 15 and paper 11 about a slotted winding mandrel 19, which mandrel is disposed proximate the end of the common channel 13. Suitable sets of driving rollers 21 and 23 may be utilized to advance film and paper together (21) or, when desired, the paper alone (23) toward the winding mandrel 19. A reciprocable knife 25, which may be of any well known type, is provided to sever the continuous paper strip upon the completion of winding.

Referring now more particularly to the scroll winding apparatus, the winding mandrel 19 is (as shown in FIG. 5) supported in a journal 26, and rotatably driven by a suitable drive mechanism 27 which is secured to a baseplate 29. A mandrel-orienting mechanism 31 positions the mandrel so that its slot 20 is disposed to receive the paper 11 as shown in FIG. 2. In this regard, the paper 11 and film 15 are guided through channel 13 with the leading end of the paper being ahead of the leading end of the film, as shown in FIG. 2. However, in order to allow room for scroll build-up during winding, the channel 13, as defined by stationary channel members 33 and 35, terminates some distance above the mandrel 19. To provide continued guiding of film and paper to the mandrel 19 a pair of moveable guide members 37, 40 are provided. The guide member 37 is reciprocably driven by actuator 34 and incorporates a recessed face 36 not only to assist in aligning the paper with the slot 20 but also to guide the longitudinal edges of both film and paper, as seen in FIG. 3, thereby to assure that successive convolutions of film and paper are wound in accurate registry. At the conclusion of scroll winding, the guide member 37 is retracted as shown in FIG. 4 to allow removal of the scroll from the mandrel 19 as will be more fully described below. Cooperating with and generally opposing the guide member 37 is the guide member 40, i.e., the generally planar face of a pivotable arm 39, which face is so located as to counteract the natural tendency of the paper to curl predictably to one side rather than follow a linear path. The guide surface 40 extends from the stationary channel member 35 to the mandrel 19 when the guide arm 39 is in the position shown in FIGS. 2 and 3. The guide arm 39 is mounted upon a shaft 38 which is rotatably driven by an actuator 42 (see FIG. 5) to swing the guide arm 39 between its aforementioned position and an inactive position, such inactive position being shown in FIG. 4.

The guide arm 39 serves an additional function at the commencement of the winding operation: When the guide arm 39 is in the position shown in FIGS. 2 and 3, a semicircular cinching notch 41 formed at the distal end of the arm 39 and coterminous with guide member 40 surrounds a portion of the cylindrical mandrel 19 ao as to define a semicircular separation space S having a width as measured radially, substantially equal to the thickness of the paper 11. As the mandrel 19 rotates in the direction shown in FIG. 3, the leading end of the paper 11 is folded and conformed to the mandrel 19 by the action of the cinching notch 41, whereby the paper is firmly cinched to the mandrel so that scroll winding may proceed. After the mandrel has rotated through an arc (of about 270°) sufficient to place the folded-over portion 11′ of the paper 11 in the nip formed by the mandrel 19 and the incoming paper 11, the arm 39 is swung to the inactive position (shown in FIG. 4) and maintained in that inactive position until a new winding sequence is commenced.

As the mandrel 19 continues to rotate, the leading end of the film 15 advances and is caught in the formed nip, causing the film and paper to be wound about the mandrel. A nozzle 42 may advantageously be employed to direct a stream of pressurized fluid, such as air, against the leading end of the film 15 so as to position the film against the face of the paper 11 so that entry of the film into the nip is assured.

As continued winding causes the scroll 43 to build in size, the outer convolution thereof encounters a spring-mounted pivotable scroll keeper 45 which is normally positioned as shown in FIGS. 2 and 3. Continued winding after such encounter gradually displaces keeper 45 to the position shown in FIG. 4 thereby causing the keeper to exert sufficient resilient force on the scroll to prevent unscrolling at the completion of winding and during transfer of the scroll into the film cartridge supply chamber. As seen most clearly in FIGS. 1 and 5, the keeper 45 is attached at its pivot point to a rotatable shaft 47 which is slidable axially by a suitable actuating mechanism in a manner to be more fully described below. At its outer end, the keeper arm 45 is attached to pin 50 which is in turn slidably received within a spring-loaded block 51 so as to bias the keeper arm 45 into its normal position as shown in FIGS. 2 and 3 and to provide the aforementioned resilient force.

Cooperative with the keeper arm 45 is a flat-faced scroll pusher 53. As shown in FIG. 1, the pusher 53 includes a transverse bore 55 operable to closely receive therewithin the spindle 19. The pusher 53 is attached to a hollow actuator tube 57 concentrically enclosing and slidable with respect to the keeper actuator shaft 47. After a fully wound scroll 43 has been formed and the trailing end of its backing paper 11 has been severed by the knife 25, a double-acting pusher actuator 59 is actuated by suitable control means 61 to advance the scroll pusher 53, along the mandrel 19, thereby to advance the scroll 43 into a generally cylindrical supply chamber 63 of a pre-positioned film cartridge body 65. See FIG. 6.

By virtue of the abutting relationship of the keeper arm 45 and scroll pusher 53, as shown in FIG. 5, when pusher 53 is advanced in the manner previously described, the keeper arm 45 is advanced along with the pusher 53 to prevent unscrolling of the wound film and paper. When the pusher 53 and keeper 45 are fully extended into the dotted-line position shown in FIG. 5 (i.e., when the scroll 43 has been transferred from the mandrel 19 to the cartridge supply chamber 63) the control means 61 causes actuator 59 to retract the pusher 53 to its original position so that winding of a new scroll may commence immediately. The keeper 45, however, is maintained by the control means 61 and the keeper actuator 49, in its extended position until the free end of the paper 11 is attached to the cartridge takeup core 67. Upon completion of the attachment function, the keeper 45 is retracted by means of the actuator 49 in time to engage the aforementioned new scroll. Adjustable stops 69 and 71 are provided to control the extent of forward movement of, respectively, the pusher 53 and the keeper 45.

Figure 6:
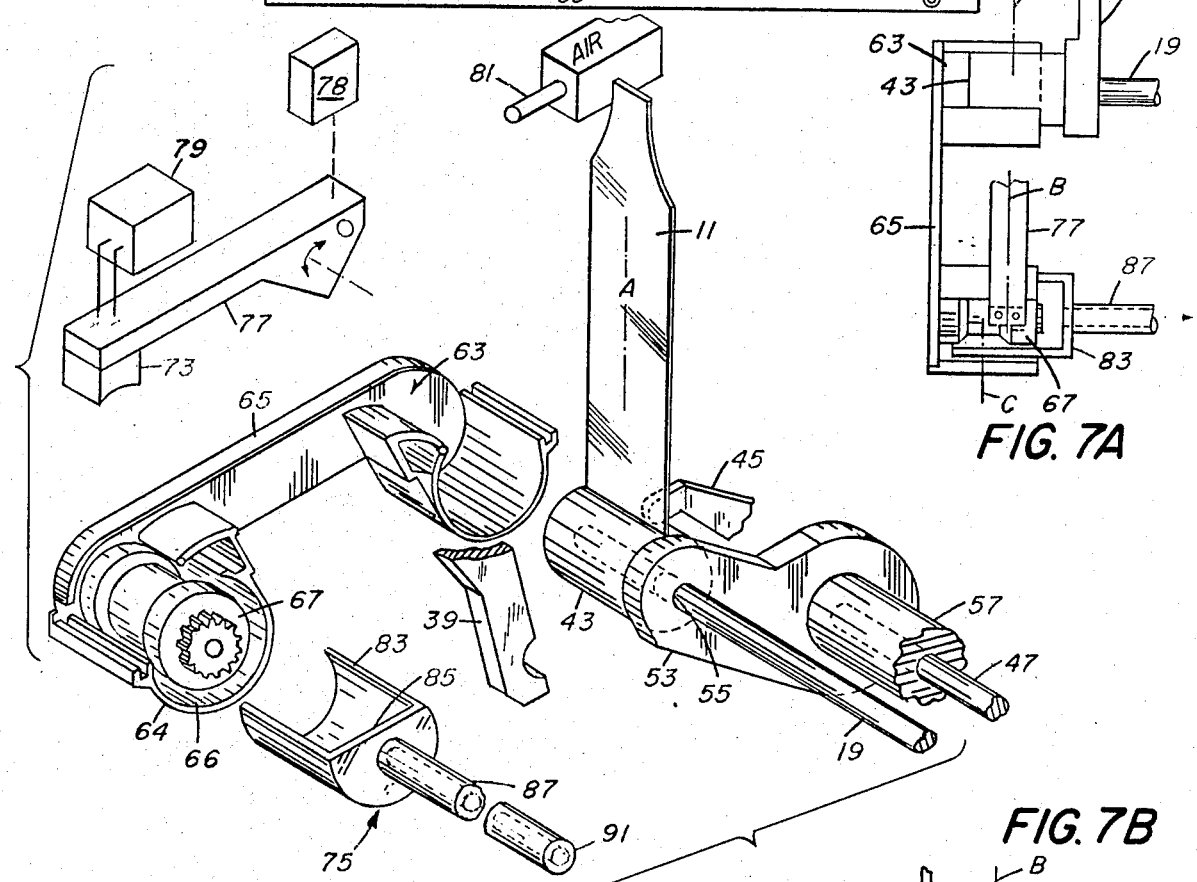
FIG. 6 depicts the scroll winding apparatus in relation to a film cartridge body operable to receive the scroll.

The above-mentioned attachment of paper 11 to takeup core 67 is advantageously accomplished by a heat sealing head 73 connected to a suitable source 79 of electrical energy. Head 73 is mounted on a pivotable arm 77, which arm is urged into heat sealing relationship with takeup core 67 by suitable means such as actuator 78 as shown in FIG. 6. The free paper end, 11″, having been previously positioned upon the core 67 by means of, for example, a jet of compressed air or other fluid from the nozzle 81, may then be heat sealed to the takeup core 67. Since the above operation is advantageously performed without removing the takeup core from the cartridge body (and in view of the fact that considerable pressure is exerted on the core by the head 73), a core support 75 is provided to prevent deformation or flexing of the cartridge, and movement of the takeup core, during heat staking. The support 75 comprises a semi-cylindrical support cup 83 which conforms to the outer periphery of the core 67 and is sufficiently thin to enter into the annular space between the core 67 and cartridge takeup chamber wall 64. A flat wall 85 closes one end of the support cup and provides a means of attachment for a slidable support cup actuator rod 87 which is reciprocally driven by an actuator means 89 (see FIG. 5). The interior of the cup 83 is, by means of a passageway 91, in communication with a vacuum source 93.

Figure 7A:
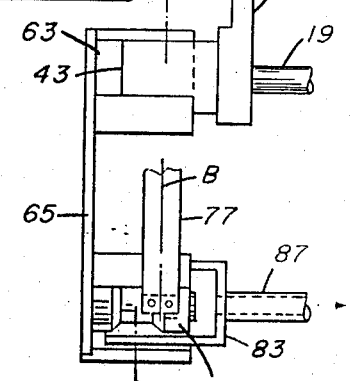
FIGS. 7A and 7B are top views of a portion of the apparatus of FIG. 6 and depict the method of aligning a film cartridge takeup core with respect to the free end of a wound scroll.
Figure 7B:
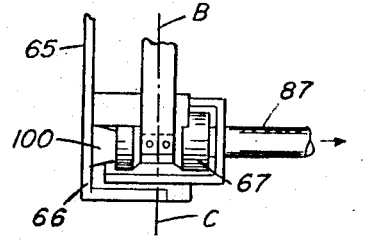

In accordance with a preferred manner of practicing the invention, precise positioning of the paper 11 on the core 67 is achieved by, first, locating the wound scroll 43 and the core support 75 in predetermined relationship to the heat-sealing head 73 and, subsequently, bringing the core 67 into alignment with the head 73. By means of the adjustable stop 69 the extent of forward travel of the scroll pusher 53 may be so regulated as to align the longitudinal axis A of the length of paper 11 (FIG. 6) with the central axis B of the heating head 73. See also FIG. 7A. It should be noted that core 67 is rotatably mounted on a conical spindle 100 carried by body 65. Core 67 is, however, not positively affixed to spindle 100, but is instead free to slide axially with respect thereto. It should also be noted that, at this point, the cartridge body 65 is so located that the lateral axis C of the core 67 is not aligned with the axis B, but, as shown somewhat exaggeratedly in FIG. 7A, is deliberately positioned outboard of such axis by suitable means, not forming any part of this invention. The precise alignment of the core axis C with the heating head axis B is accomplished by advancing the core support cup 83 to such a position (as regulated by adjustable stop 99) that, when vacuum is applied in response to a signal from vacuum control 97 to the vacuum source 93, the core 67 is moved axially so that its end contacts the core support wall 85, thereby aligning the core axis C with the heating head axis B, as shown in FIG. 7B. The core 67 is thus partially withdrawn from the cartridge takeup chamber 66 by means of the vacuum, the arm 77 being then pivoted into position to accurately seal the paper 11 to the core 67. See FIG. 7B.

The vacuum from source 93 may then be shut off by means of control 97 and core support cup 83 may be withdrawn from the takeup chamber. Core 67 and scroll 43 may then be slid completely into their respective chambers and a new winding sequence commenced.

The invention has been described in detail with particular reference to preferred embodiments thereof, but it will be understood that variations and modifications can be effected within the spirit and scope of the invention.

What is claimed is:

1. Apparatus for use in loading a web into a receptacle, said receptacle having a supply compartment, a takeup compartment, and a takeup core rotatably housed within said takeup compartment, said apparatus comprising:
   mandrel means for forming said web into a wound scroll having a free web end;
   means for transferring said scroll from said mandrel means to said supply compartment;
   means for positioning said free web end with respect to said core;
   cup means for entering said takeup compartment to support said takeup core therewithin; and
   means for attaching said free web end to said takeup core while said takeup core is supported by said cup means.

2. The invention of claim 1 wherein said scroll-forming means includes a generally cylindrical rotatable winding mandrel, channel means for guiding said web to said mandrel, and cinching means for positioning said web with respect to said mandrel.

3. The invention of claim 2 wherein said channel means includes first and second stationary channel members defining a stationary channel terminal end spaced from said mandrel, and wherein said channel means further includes first and second movable web guide means disposed between said mandrel and said terminal end of said channel.

4. The invention of claim 3 wherein said web has a tendency to curl in a given direction, and wherein said second movable guide means comprises a generally planar guide surface extending generally from said stationary channel terminal end to said winding mandrel and disposed to intercept said web when said web curls in said given direction.

5. The invention of claim 4 wherein said scroll transferring means includes a pusher member mounted for axial movement with respect to said mandrel and defining means surrounding the cylindrical surface of said mandrel for engaging a scroll wound upon said mandrel to effect relative axial movement of said scroll with respect to said mandrel.

6. The invention of claim 5 wherein said web loading apparatus further includes means for resiliently engaging said scroll to prevent unwinding thereof.

7. The invention of claim 1 wherein said web comprises a photosensitive strip member and a superimposed backing strip member so disposed with respect to said photosensitive strip member as to form said free end of said web when said web is wound into said scroll.

8. Apparatus for use in loading a web into a receptacle, said receptacle having a supply compartment, a takeup compartment, and a generally cylindrical takeup core rotatably housed within said takeup compartment, said apparatus comprising:
   means for forming said web into a wound scroll having a free end;
   a sealing head means for attaching said free web end to said takeup core;
   means for inserting said scroll at least partially into said supply compartment to position said free web end with respect to said sealing head means;
   means insertable into said takeup compartment for supporting said core and for positioning said core within said compartment with respect to said free web end and to said sealing head means; and
   means for urging said sealing head means into sealing engagement with said free web end and said takeup core to attach said web end to said core.

9. The invention of claim 8 wherein said takeup compartment includes a curved peripheral wall and said insertable means includes means positionable between said takeup compartment wall and a cylindrical surface of said takeup core for supporting said core.

10. The invention of claim 9 wherein said insertable means includes means in communication with a source of vacuum for positioning said core with respect to said insertable means.

* * * * *